(12) United States Patent
Glenn

(10) Patent No.: US 7,230,646 B2
(45) Date of Patent: Jun. 12, 2007

(54) SINGLE SENSOR ELECTRONIC VIDEO CAMERA TECHNIQUE WITH DIAGONALLY COUPLED PIXELS

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 645 days.

(21) Appl. No.: 09/746,563

(22) Filed: Dec. 22, 2000

(65) Prior Publication Data

US 2001/0030698 A1 Oct. 18, 2001

Related U.S. Application Data

(60) Provisional application No. 60/171,362, filed on Dec. 22, 1999.

(51) Int. Cl.
*H04N 5/335* (2006.01)
*H04N 3/14* (2006.01)

(52) U.S. Cl. .......................... 348/315; 348/283

(58) Field of Classification Search ............... 348/272, 348/273, 280, 281, 342, 283, 294, 302, 303, 348/311, 315, 321, 323
See application file for complete search history.

(56) References Cited

U.S. PATENT DOCUMENTS

| | | | | |
|---|---|---|---|---|
| 4,611,243 A | * | 9/1986 | Morisawa et al. | 348/342 |
| 4,758,883 A | * | 7/1988 | Kawahara et al. | 348/222.1 |
| 4,985,758 A | * | 1/1991 | Hashimoto | 348/283 |
| 4,989,075 A | * | 1/1991 | Ito | 348/280 |
| 5,132,803 A | * | 7/1992 | Suga et al. | 348/315 |
| 5,194,944 A | * | 3/1993 | Uchiyama et al. | 348/223.1 |
| 5,805,217 A | * | 9/1998 | Lu et al. | 348/273 |
| 6,577,341 B1 | * | 6/2003 | Yamada et al. | 348/272 |
| 6,924,840 B1 | * | 8/2005 | Furuhata | 348/264 |

* cited by examiner

*Primary Examiner*—Tuan Ho
*Assistant Examiner*—Timothy J. Henn
(74) *Attorney, Agent, or Firm*—Martin Novack

(57) ABSTRACT

A method for producing electronic video signals representative of color images of a scene, includes the following steps: providing a sensor having a color filter thereover; providing a motion picture film camera type of lens system that focuses light from the image onto the color filter and sensor; and producing electronic video signals from the output of the sensor; the sensor including a sensor array having alternate lines offset by half a pixel spacing, and diagonally coupled pixels on successive lines, and the color filter having repeating R, G, and B patterns offset on successive lines so that R pixels are arranged diagonally, G pixels are arranged diagonally, and B pixels are arranged diagonally.

4 Claims, 2 Drawing Sheets

SINGLE SENSOR ELECTRONIC VIDEO CAMERA TECHNIQUE WITH DIAGONALLY COUPLED PIXELS

RELATED APPLICATIONS

The present Application claims priority from U.S. Provisional Patent Application No. 60/171,362, filed Dec. 22, 1999, and said Provisional Patent Application is incorporated herein by reference.

FIELD OF THE INVENTION

This invention relates to a color video camera system that can be utilized for motion picture film origination.

BACKGROUND OF THE INVENTION

Color motion pictures are often made by shooting the action with a film camera, converting the images to digital form, computer processing the digital images, and then scanning the processed images back onto film for release. It would be advantageous to have a practical electronic color video camera that could directly shoot the action to obtain color video from which good quality color motion picture film could ultimately be produced, but this has not yet been achieved. A major reason is that the expensive high quality lenses used in motion picture film cameras have optical characteristics and requirements that are not readily adaptable to electronic video cameras.

It is among the objects of the present invention to devise an electronic color video camera that can utilize the types of high quality lenses that are used in motion picture color film cameras. It is also among the objects of the present invention to provide an improved single sensor camera that can be utilized, inter alia, for such purpose.

SUMMARY OF THE INVENTION

In accordance with an embodiment of the invention a method is set forth for producing electronic video signals representative of color images of a scene, comprising the following steps: providing a sensor having a color filter thereover; providing a motion picture film camera type of lens system that focuses light from said image onto said color filter and sensor; and producing electronic video signals from the output of said sensor; said color filter having a pattern RYRY . . . on alternating lines, and a pattern YRYR . . . on every other line.

In accordance with a further embodiment of the invention, a method is set forth for producing electronic video signals representative of color images of a scene, comprising the following steps: providing a sensor having a color filter thereover; providing a motion picture film camera type of lens system that focuses light from said image onto said color filter and sensor; and producing electronic video signals from the output of said sensor; said sensor comprising a sensor array having alternate lines offset by half a pixel spacing and said color filter having repeating R, G, and B patterns offset on successive lines so that R pixels are arranged diagonally, G pixels are arranged diagonally, and B pixels are arranged diagonally.

Further features and advantages of the invention will become more readily apparent from the following detailed description when taken in conjunction with the accompanying drawings.

DETAILED DESCRIPTION

Figure 1:
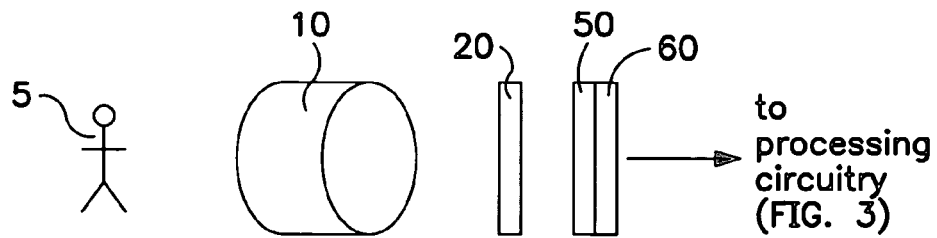
FIG. 1 is a diagram of a camera system in accordance with an embodiment of the invention.

FIG. 1 shows a camera system in accordance with an embodiment of the invention and which can be utilized in practicing an embodiment of the method of the invention. Light received from a scene 5 being viewed (typically, a moving scene) is received and focused by a motion picture film camera type of lens, represented in the Figure by lens 110, which is typically a multi-element lens or lens system. Light from the image is passed through an optical low pass prefilter 20 which can be, for example, a birefringent filter or a diffraction grating filter. The light output from prefilter 20 is incident on an image sensor 60 which has a color pattern filter 50 thereon. In an example of the present embodiment, the image is oversampled. A CCD sensor 60 of a type made by Eastman Kodak Company has 1620×2880 pixels, which can be clocked out at 40 MHz to two horizontal registers and scan converted to 1080×1920.

Figure 2:
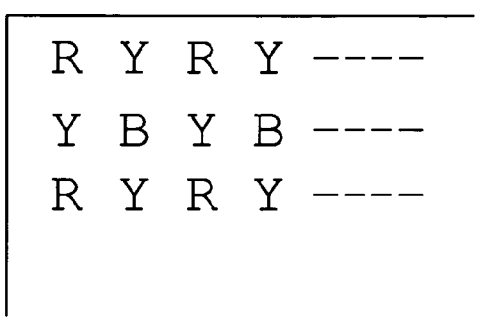
FIG. 2 shows an embodiment of a color filter pattern.

The color pattern filter 50 of the present embodiment is shown in FIG. 2. In this pattern, Y (luminance) can be a diagonally sampled pattern with 1600 line resolution both vertically and horizontally and 1100 lines diagonally. After scan conversion to 1080 lines, the resolution would be about 900 lines in all directions. The red and blue signals can be cardinally sampled at 810 lines both directions. The diagonal resolution would be about 1100 lines. After scan conversion to 1080 lines, its resolution would be about 700 lines in all directions. Since R and B are used to produce isoluminant color signals, the difference in resolution will be acceptable.

Figure 3:
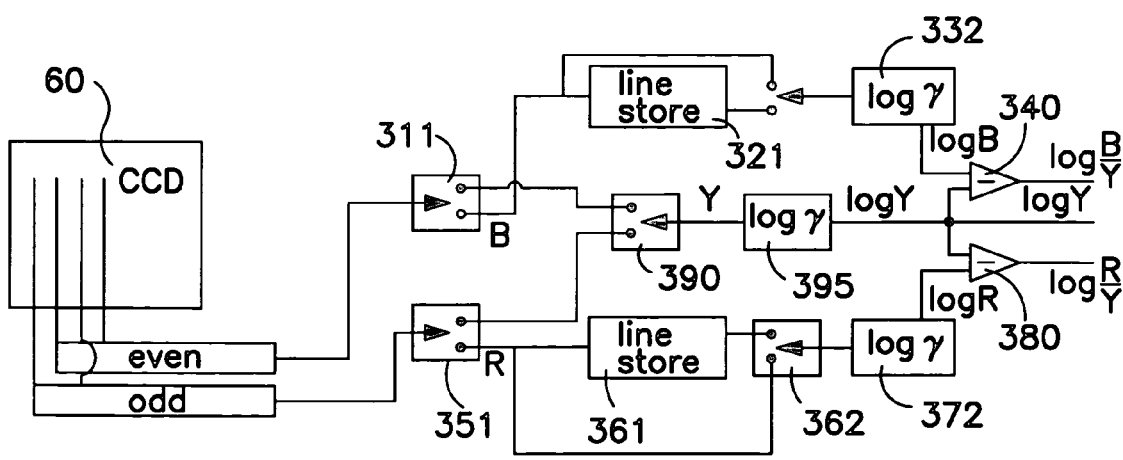
FIG. 3 shows processing circuitry of an embodiment of the invention.

FIG. 3 shows an example of processing circuitry that can be utilized in the present embodiment to obtain output luminance and color related signals. The CCD sensor 60 has horizontal registers 61 and 62 which respectively receive the odd and even pixels. The register outputs are coupled to respective line rate multiplexers 311 and 351. The multiplexer 351 alternately receives R and Y, and the multiplexer 311 alternately receives Y and B. The alternate Y pixels from each line are taken in sequence by multiplexer 390, and gamma corrected (block 395) to obtain the output log Y. The R and B components appear only on every other column and row. Accordingly, line stores 321 and 361, in conjunction with respective switches 322 and 362 operate to repeat the respective blue and red signals on the lines from which they are missing. The outputs of switches 332 and 362 are gamma corrected (blocks 332 and 372), and difference circuits 340 and 380 are respectively used to obtain log B/Y and log R/Y.

The sensor and color filter of FIG. 2 requires an optical prefilter to prevent color moire. The pre-filter needs to be a lower pass filter for R and B than for Y. One way to do this is to select the filter characteristic of prefilter 20 as a compromise between the two requirements. An alternative way would be to use a rotating disc as part of the shutter. This disc can be two very shallow prisms bonded on opposition. By proper choice of index of refraction and dispersion the R and B can be displaced with respect to G (one could, for example, have no displacement for G and displacement in opposite directions for R and B). If this disc is rotated, each pixel in the image will rotate in a circle. R and B pixels could rotate in a larger diameter circle than G (which is most of Y). This would provide Y with higher resolution than R & B and would eliminate color moire effects.

Figure 4:
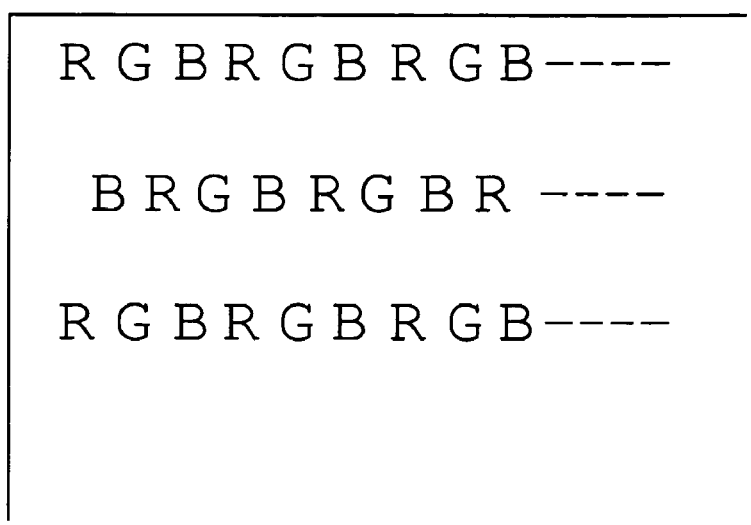
FIG. 4 shows a color filter pattern of another embodiment.

A further embodiment hereof uses a color filter pattern for a single sensor camera that permits the same prefilter. This color filter is shown in FIG. 4. The corresponding pixel pattern on alternating lines, and on alternating columns is offset by half a pixel. The pattern takes advantage of the fact that diagonally sampled images require 0.7 times as many pixels for the same perceived sharpness as cardinally sampled images. The number of lines in the image need to be 20% more than the cardinally sampled image but the number of samples per color per line can be 0.6 times that in a cardinally sampled image as long as the samples on adjacent lines are offset by half a pixel spacing for that color. It has an additional advantage that the total number of pixels is the same as used in a 4:2:2 recording even though the output is equal resolution R G B.

Figure 5:
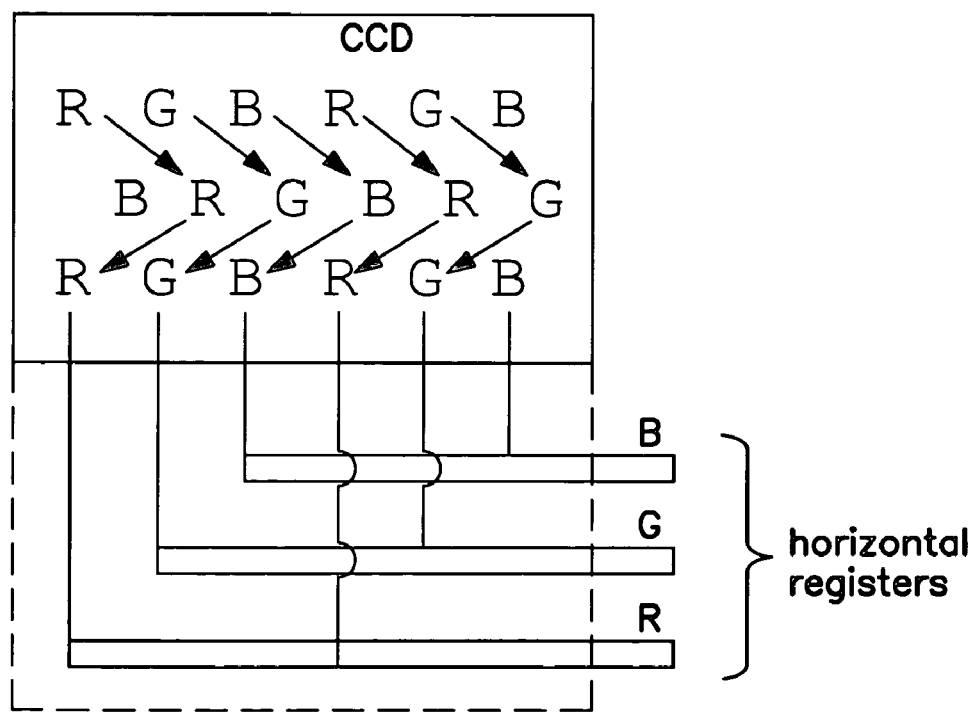
FIG. 5 illustrates an example of the read out of diagonally offset pixels to registers.

In an example of this embodiment, the line spacing can be 10 microns and the spacing between pixels of the same color on a line can be 20 microns. The subpixel width would therefore be a little under 7 microns. This system would have the same perceived resolution as a cardinally sampled 21×12 micron pixel CCD. The same result can be achieved if this pattern is rotated 90 degrees. FIG. 5 illustrates an example of how the diagonal offset pixels can be read out to three horizontal registers, for R, G, and B, respectively.

The invention claimed is:

1. Apparatus for producing electronic video signals representative of color images of a scene, comprising:

a sensor having a color filter thereover;

a lens system that focuses light from said image onto said color filter and sensor; and means for producing electronic video signals from the output of said sensor;

said sensor comprising a sensor array having alternate lines offset by half a pixel spacing, and diagonally coupled pixels on successive lines, and said color filter having repeating R, G, and B patterns offset on successive lines so that R pixels are arranged diagonally, G pixels are arranged diagonally, and B pixels are arranged diagonally;

said means for producing electronic video signals from the output of said sensor including a first register to which are input solely R pixels, diagonally offset in alternating directions, for successive vertically adjacent lines of a group of lines, a second register to which are input solely G pixels, diagonally offset in alternating directions, for successive vertically adjacent lines of said group of lines, and a third register to which are input solely B pixels, diagonally offset in alternating directions, for successive vertically adjacent lines of said group of lines.

2. Apparatus as defined by claim 1, further comprising a low pass prefilter interposed before said color filter.

3. Apparatus as defined by claim 1, wherein said lens system is a motion picture film camera type of lens system.

4. Apparatus as defined by claim 2, wherein said lens system is a motion picture film camera type of lens system.

* * * * *